UNITED STATES PATENT OFFICE.

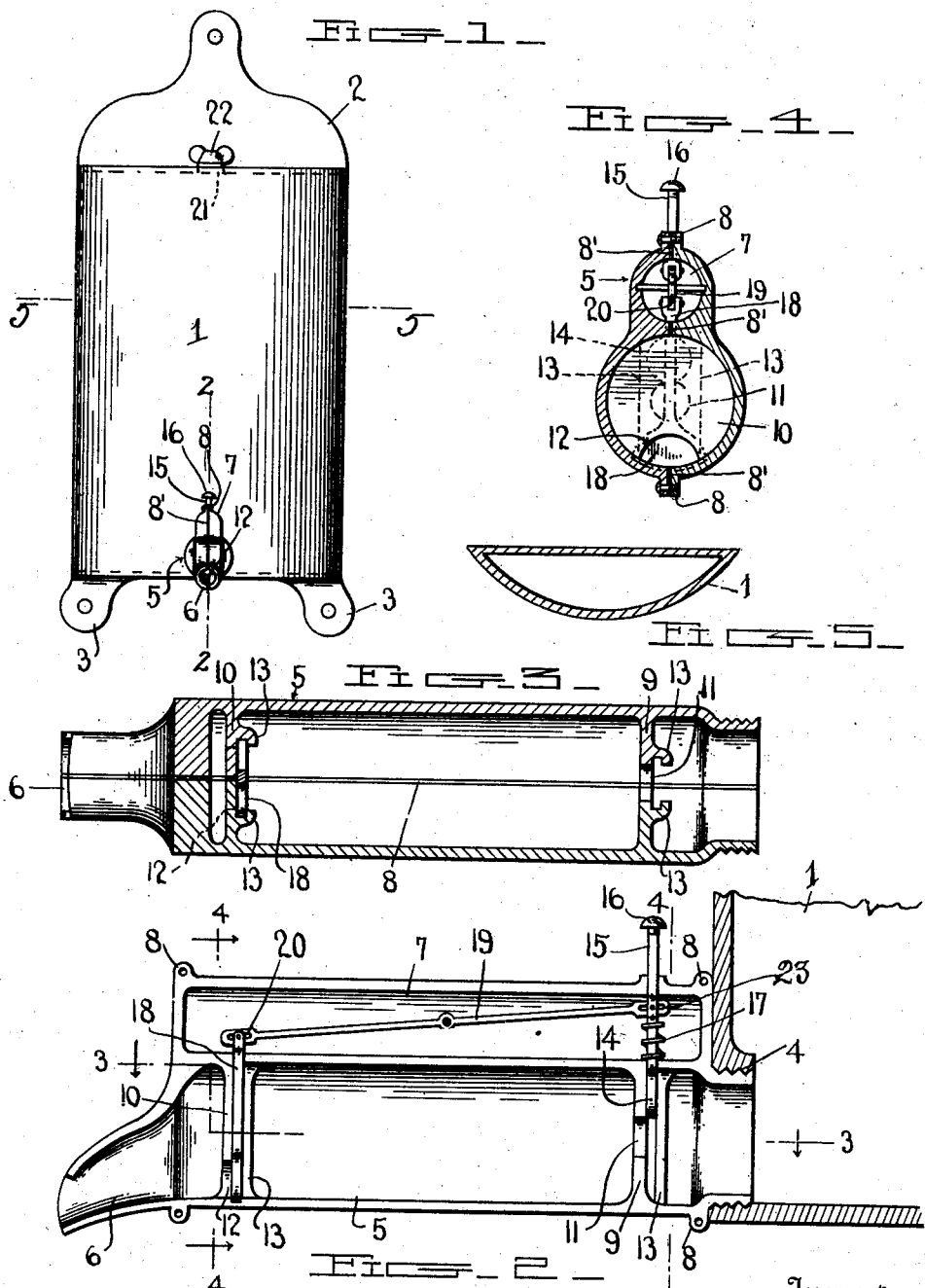

LOGAN ALFRED DILS, OF CENTRALIA, WASHINGTON, ASSIGNOR OF ONE-HALF TO ALLEN A. MILLER, OF CENTRALIA, WASHINGTON.

LIQUID-SOAP CONTAINER.

994,250.  Specification of Letters Patent.  Patented June 6, 1911.

Application filed December 15, 1910. Serial No. 597,402.

*To all whom it may concern:*

Be it known that I, LOGAN A. DILS, a citizen of the United States, residing at Centralia, in the county of Lewis and State of Washington, have invented certain new and useful Improvements in Liquid-Soap Containers; and I do declare the following to be a full, clear, and exact description of the invention, such as will enable others skilled in the art to which it appertains to make and use the same.

This invention relates to improvements in liquid soap containers.

The object of the invention is to provide a liquid soap container having an improved construction and arrangement of liquid measuring and dispensing mechanism whereby a fixed quantity of soap is discharged at each operation of the discharging mechanism.

With this object in view the invention consists of certain novel features of construction, combination and arrangement of parts as will be more fully described and particularly pointed out in the appended claim.

In the accompanying drawings: Figure 1 is a front view of a liquid container embodying my invention; Fig. 2 is a vertical longitudinal section through a portion of the container and the measuring and dispensing mechanism on the plane of the line 2—2 of Fig. 1; Fig. 3 is a horizontal sectional view through the measuring and dispensing mechanism on the plane of the line 3—3 of Fig. 2; Fig. 4 is a vertical cross sectional view of the same on the plane of the line 4—4 of Fig. 2; Fig. 5 is a horizontal sectional view through the container on the plane of the line 5—5 of Fig. 1.

Referring more particularly to the drawings, 1 denotes a tank or container which is preferably formed of sheet metal and is of a semi-elliptical shape in cross section. The container is provided on its upper end with an attaching plate 2 and on its lower ends with attaching lugs 3. The plate 2 and lugs 3 have formed therein holes which are adapted to receive screws or similar fastening devices whereby the container may be secured to a wall or other support and arranged in position over a basin or wash bowl.

In the outer side of the container near the lower end is formed a threaded discharge opening 4 into which is adapted to be screwed the reduced threaded inner end of a combined measuring and dispensing mechanism whereby the soap may be discharged from the container in fixed or predetermined quantities. The measuring and dispensing mechanism comprises a measuring tube 5 having on its outer end a discharge spout 6. Arranged above and formed integral with the tube 5 is a chamber 7 in which is arranged the operating mechanism for the measuring and discharge valves hereinafter described. The tube 5, spout 6 and chamber 7 are preferably formed in two semi-cylindrical sections which are secured together by a bolt or other suitable fastening device which is engaged with pairs of apertured lugs 8 formed on the upper and lower sides of the sections as shown. Between the jointed edges of the sections is arranged a packing washer 8' which will effectually prevent any leaking between the sections.

Arranged in the measuring tube 5 near its inner and outer ends are transverse partitions 9 and 10 which form between themselves a measuring chamber of the desired size. In the partition 9 is formed a centrally disposed discharge passage 11, while in the partition 10 near the bottom of the tube is formed a discharge passage 12. Formed on these partitions 9 and 10 are guide flanges 13. Between the flanges 13 of the partition 9 is arranged a measuring valve 14, the stem 15 of which projects upwardly through the top of the chamber 7 as shown. On the stem 15 is arranged a head or knob 16 by means of which the stem 15 and valve 14 are forced downwardly and thus close the passage 11 in the partition 9. On the stem 15 in the chamber 7 is arranged a coiled retracting spring 17 whereby the valve 14 is normally held open. When the valve plate 14 is depressed the lower portion thereof is brought opposite or over the hole 11 in the partition 9 thus closing said hole and cutting off the discharge of liquid from the container to the measuring tube.

Slidably mounted in the guide flanges 13 of the partition 10 is a discharge valve 18 the upper end of which projects into the chamber 7. Pivotally mounted midway between its ends in the chamber 7 is an operating lever 19 the opposite ends of which are slotted at 20 and 23 as shown. The forward or outer slotted end of the lever 19 has a loose connection with the upper end of the valve 18 as shown at 20, while the opposite slotted end of the lever has a loose connection with the stem 15 of the valve 14 as shown at 23 whereby when said stem 15 and valve 14 are forced downwardly and the flow of liquid from the container to the measuring tube is cut off the lever 19 will be rocked on its pivotal support in the chamber 7 which will cause the outer end of the lever to lift or open the valve 18 thus permitting the liquid contained in the measuring tube 5 to discharge out through the opening 12 and spout 6. As long as the stem 15 and valve 14 are depressed no more liquid can flow from the container into the measuring tube, thus permitting only so much liquid as is contained in the tube to be discharged at each operation of the discharging mechanism thereby preventing the waste of the soap or the discharge of more than the necessary quantity from the container. As soon as the stem of the valve 14 has been released the spring 17 will retract said valve which operation will actuate the lever 19 and cause the opposite end of the same to close the valve 18, thus permitting another charge of liquid soap to flow into the measuring tube where it will remain until the next operation of the valve. In the top of the container is arranged a filling opening 21 which is normally closed by a screw cap or plug 22.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

In a device of the character described, a container having formed therein a filling opening, said container having a flat rear side adapted to fit close against a wall or other support, a combined measuring and dispensing mechanism comprising a measuring tube, a spout formed on the outer end of said tube, a chamber arranged on the upper end thereof, said tube, spout and chamber being formed in separable longitudinal sections, a packing ring between said sections, apertured partitions arranged in said measuring tube and spaced a suitable distance apart to form a measuring compartment of the desired size, a measuring valve arranged in one end of said tube, a discharge valve arranged in the opposite end thereof, an operating stem connected with said measuring valve and projecting upwardly through the chamber above said measuring tube, a spring arranged on said stem to open and normally hold said measuring valve in open position, a valve operating lever pivotally mounted in said chamber and having a loose connection at its opposite ends with the stem of said measuring valve and with the upwardly projecting end of the discharge valve whereby when said measuring valve is depressed to a closed position said discharge valve will be simultaneously opened to permit the discharge of the liquid contained in said measuring chamber.

In testimony whereof I have hereunto set my hand in presence of two subscribing witnesses.

LOGAN ALFRED DILS.

Witnesses:
DAVID STEWART,
J. E. SAMCRAN.

---

Copies of this patent may be obtained for five cents each, by addressing the "Commissioner of Patents, Washington, D. C."